United States Patent

Uchiyama et al.

[11] Patent Number: 5,716,238
[45] Date of Patent: Feb. 10, 1998

[54] HOUSING FOR AN ELECTRICAL DEVICE

[75] Inventors: Takahiro Uchiyama; Shinji Ogawa, both of Yokkaichi, Japan

[73] Assignee: Sumitomo Wiring Systems, Ltd., Japan

[21] Appl. No.: 696,184

[22] Filed: Aug. 13, 1996

[30] Foreign Application Priority Data

Sep. 8, 1995 [JP] Japan .................. 7-256940

[51] Int. Cl.⁶ ........................... H01R 17/00
[52] U.S. Cl. ........................ 439/660; 439/857
[58] Field of Search ................... 439/660, 857, 439/855, 854, 239, 342, 685

[56] References Cited

U.S. PATENT DOCUMENTS

| 3,312,931 | 4/1967 | Keller | 439/855 |
| 3,753,193 | 8/1973 | Teagno et al. | 439/854 |
| 4,109,992 | 8/1978 | Hughes et al. | 439/685 |
| 4,902,247 | 2/1990 | Suzuki et al. | 439/595 |
| 5,098,308 | 3/1992 | Seibel | 439/192 |
| 5,336,105 | 8/1994 | Wisner | 439/685 |
| 5,586,901 | 12/1996 | Muta | 439/342 |

FOREIGN PATENT DOCUMENTS

| 3640552 A1 | 6/1987 | Germany . |
| 63-155275 | 10/1988 | Japan . |
| 6-21790 | 6/1994 | Japan . |
| 2151860 | 7/1985 | United Kingdom . |

*Primary Examiner*—Gary F. Paumen
*Assistant Examiner*—Tho D. Ta
*Attorney, Agent, or Firm*—Banner & Witcoff, Ltd.

[57] ABSTRACT

A lower case (30), constituting a housing, has a terminal fitting insertion tube (35) supporting a terminal (42) of an electrical appliance (40). The insertion hole (35) allows the insertion of a terminal fitting (50) which is inserted from the exterior for direct contact with the terminal of the electrical appliance. Intermediate wiring is unnecessary.

17 Claims, 2 Drawing Sheets

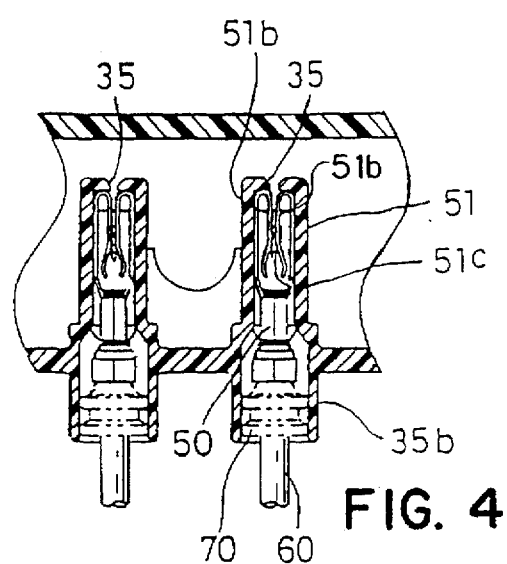
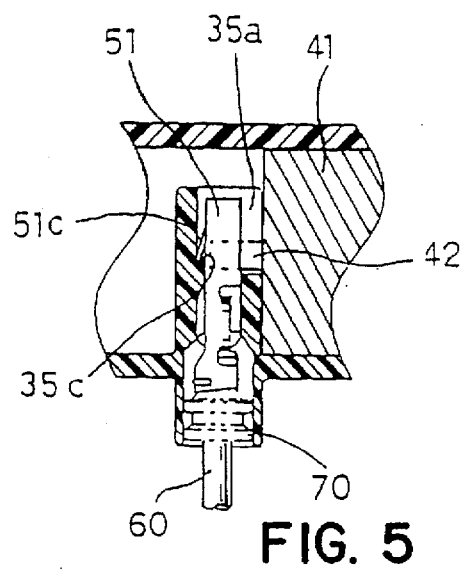
FIG. 4
FIG. 5
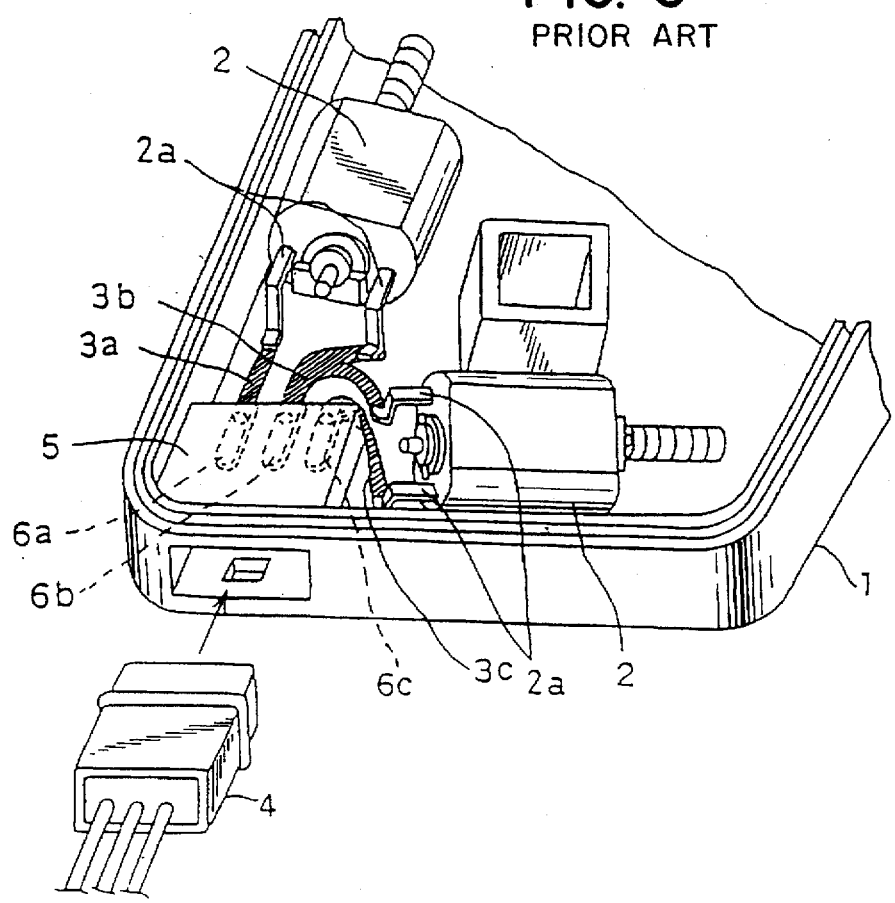
FIG. 6
PRIOR ART

HOUSING FOR AN ELECTRICAL DEVICE

TECHNICAL FIELD

The present invention relates to a housing for an electrical appliance, in particular to a housing that allows an electrical appliance to be fitted therewith, and at the same time causes the appliance to be electrically connected to the exterior.

BACKGROUND TO THE INVENTION

FIG. 6 of this specification shows a conventional example of a power unit for an electrically driven door mirror of a car, and using an electrical appliance housing as described in Japanese Laid-Open Publication 63-155275.

In the drawing, a shallow plate shaped lower case 1 constitutes a housing. In the interior thereof are two motors 2 which serve to generate a driving force for mirror adjustment. The inner base face of the lower case 1 has, located at one end, connections 3a to 3c that attach to terminal fittings 2a of the motors 2. The other ends of the connections 3a to 3c extend up to the edge of the lower case 1 where they are connected to terminals 6a to 6c supported in a connecting member 5 that is itself connectable to an external connector 4.

In the conventional electrical appliance housing described above, there is a problem in that it is necessary to provide intermediate wiring that extends between the motor 2 and the connecting member 5. This increases cost and the extra connections are a potential source of unreliability.

The present invention has been developed after taking the above problem into consideration, and aims at presenting an electrical appliance insertion box which is simplified by doing away with the intermediate wiring.

SUMMARY OF THE INVENTION

According to the invention there is provided a housing for an electrical device, the housing having a body with a formation thereon for removably receiving and locating a conductive terminal of the device, the formation being of insulating material and having a through channel to receive and locate said terminal from one side of the body and a passage to receive and locate a conductive terminal fitting from the other side of the body, the channel being at least partially coincident with the passage.

Such an arrangement eliminates the need for intermediate wiring or separate insulated connectors, both of which increase cost and complexity.

The formation is preferably tubular and may extend on both sides of the body on a common axis.

In the preferred embodiment the passage and channel are substantially at right angles. The passage may be cylindrical and the channel may be rectangular. The channel may comprise a slot in an end face and side wall of a tubular formation. Such a construction is adapted to directly receive a protruding terminal of an electrical device.

The tubular formation may be adapted to receive an external lead having a waterproof plug, the plug engaging the inside of the formation in use to prevent ingress of moisture. The tubular formation may protrude on the exterior side.

Other features of the invention will be apparent from the following description of a preferred embodiment shown by way of example only in the accompanying drawings.

BRIEF DESCRIPTION OF THE DRAWINGS

FIG. 4 is a partially cut-away cross-section through the housing.

FIG. 5 is a partially cut-away cross-section through the housing in a different direction.

FIG. 6 is a perspective view of a base unit of a conventional electric door mirror assembly.

DESCRIPTION OF PREFERRED EMBODIMENT

Figure 1:
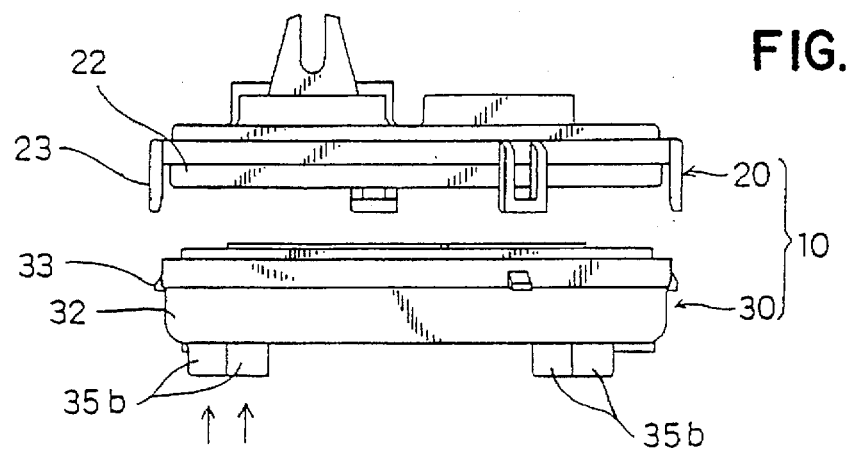
FIG. 1 is a side elevation of a base unit of an electrically driven door mirror using a housing of an embodiment of the present invention.
Figure 2:
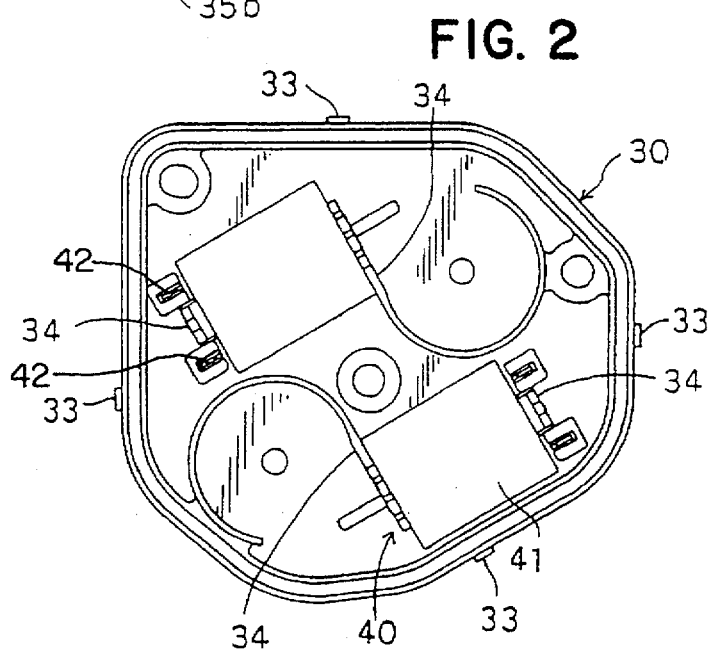
FIG. 2 is a plan view of the housing.
Figure 3:
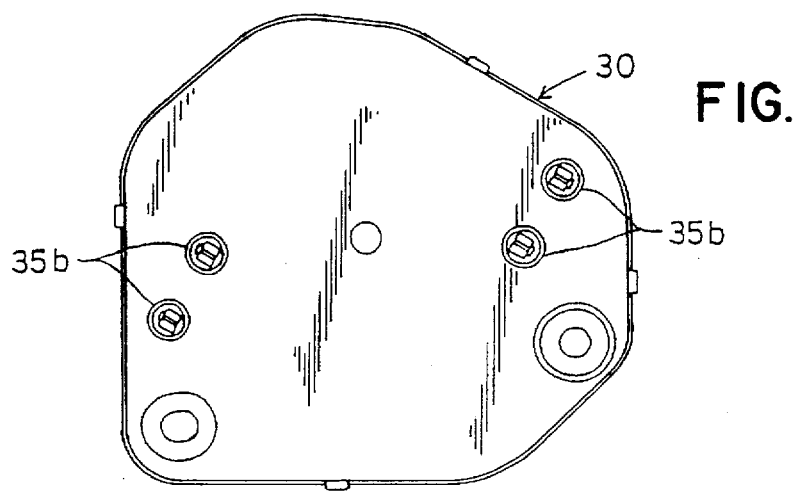
FIG. 3 is a view of the underside of the housing.

FIG. 1 shows a base unit 10, which constitutes a housing, assembled from an upper case 20 and a lower case 30. The upper case 20 and the lower case 30 are both plate shaped and have shallow side walls 22,32 which fit with each other and thereby forming a shallow box. Moreover, the ends of the side wall 22 and 32 are shaped so as to fit closely, thereby giving a simple water-proof structure. The exterior faces of the side walls 22 and 32 have integral snap-fit connections 23,33 of a well known kind.

The lower case 30 allows two motors 40 to be housed therein. Ribs 34 formed to correspond to the outer shape of a motor casing 41 serve to locate the motor 40 and to fix the motor 40 in place by clamping it between the upper case 20 and the ribs 34. Terminals 42 project from the posterior end face of each of the motors 40. Terminal fitting insertion tubes 35 that connect with the ribs 34 and open out to the lower face are formed in the lower case 30. The terminal fittings 42 pass through these terminal fitting insertion tubes 35 and are supported therein.

With reference to FIGS. 4 and 5, the terminal fitting insertion tubes 35 have slits 35a that extend along the posterior end face of the motor 40 in a projecting portion located in the inner side face of the lower case 30. The slits 35a allow the insertion of the terminals 42, the insertion being effected from the upper side in the downward direction. The terminals 42 of the motor 40 are formed so as to be shaped like a male tab and have front and rear faces that are parallel to the axial direction of the terminal fitting insertion tube 35. When the motor 40 is attached from the upper side of the lower case 30, the terminals 42, which project in a direction perpendicular to the terminal fitting insertion tubes 35, enter the slits 35a from the upper end and are supported in a state whereby they pass across the insertion tubes 35. The tubes 35 and ribs 34 together locate the motor 40 in the housing.

The terminal fitting insertion tube 35 has a pipe member 35b projecting from the exterior face of the lower case 30. This pipe member 35b has a greater diameter than the portion on the inner side of the lower casing.

An external terminal fitting 50 has an electric wire 60 and a rubber stopper 70 crimped on a posterior end, and is insertable into the tube 35 from the pipe member 35b. A connecting member 51 is formed in a C-shape when seen in cross-section, and has two tongues 51b bent mutually inwards from the free end towards the interior. Consequently, when the terminal fitting 50 is inserted into the tube 35 from its open end, ensuring that the fitting 50 faces the posterior face side of the motor 40, the terminal 42 of the motor 40 enters between the tongue members 51b. This results in an electrical connection being established. The side wall of the connecting member 51 has a lance 51c formed by cutting away in an insertion direction. The lance 51c fits into a stepped member 35c formed on the inner wall of the tube 35. (FIG. 5).

In the present embodiment, the motor 40 is the electric appliance. However other kinds of electrical appliances can be connected to the exterior using the invention for example, a relay, a fuse, an electric element, and so on. Furthermore, although the motor 40 is supported with the terminals 42 projecting from its posterior end, in the case where a lead wire alone is provided and a fitting is absent, it may be arranged so that a fitting is attached to an anterior end of the lead wire. Alternatively, the lead wire can be supported so as to be perpendicular to the tube 35 and a crimping blade formed at an anterior end of the external terminal fitting 50, resulting in a crimped connection. Of course, if a terminal such as the terminal 42 is used, the intermediate wiring disappears completely, which is most effective.

The tube 35 allows the insertion of the external terminal fitting 50 from the outside, provides support and is mutually connectable with one or more of the terminals 42 of the motor 40, this support and mutual connection being effected at the inner side of the hole. Consequently, the insertion direction, the shape of the interior, etc., can be changed as required. Of course, the external terminal fitting 50 can be varied in shape as desired in correspondence with the terminal 42. The configuration can be such that the terminal fitting 42 is not clamped but is provided along a side wall, and a tongue member connects with the surface of the terminal 42 by being pressed against it.

The rubber stopper 70 provided at the rear enters into the pipe member 35b which has a relatively large diameter, and seals the terminal connection against moisture. The rubber stopper 70 is optional. Moreover, although the illustrated rubber stopper 70 is crimped simultaneously with the electric wire 60, it is not necessary to have simultaneous crimping, and the rubber stopper 70 alone may be passed along the electric wire.

The operation of the present embodiment, is now explained.

The motors 40 and other necessary components such as gears, etc., are attached to the upper face of the lower case 30. Then, the upper case 20 is fitted to the lower case 30. When the motor 40 is attached, the terminals 42 at the posterior end are guided and fit into the slit 35a from the upper end of the terminal fitting insertion tube 35.

When the base unit constituting the housing is assembled, the external terminal fittings 50 are inserted into the terminal insertion tubes 35, and engage the terminals 42. The waterproof rubber stopper 70 forms a water-proof seal between the electric wire 60 and the inner peripheral wall of the tube 35.

Thus the external terminal fitting 50 is inserted from the exterior, and can make direct contact with a terminal of the electrical appliance, thereby making any intermediate wiring unnecessary.

We claim:

1. A housing for an electrical device, the housing having a body with a formation thereon for removably receiving and locating a conductive terminal of the device, the formation being of insulating material and having a sidewall, an end wall, a through channel to receive and locate said terminal from one side of the body, and a passage to receive and locate a conductive terminal fitting from the other side of the body, the channel being a slot extending through the end wall and the sidewall of the formation so that the channel is at least partially coincident with the passage and receives the terminal of the device to effect electrical connection with the terminal received into the passage.

2. A housing according to claim 1 in which the formation is tubular.

3. A housing according to claim 2 in which the formation extends on both sides of said body on a common axis.

4. An assembly according to claim 3 in which said channel and passage are substantially at right angles.

5. A housing according to claim 2 in which said channel and passage are substantially at right angles.

6. A housing according to claim 5 in which said passage is cylindrical and said channel is rectangular.

7. A housing according to claim 1 in which two such formations are provided for receiving and locating respective terminals of the device.

8. A housing according to claim 7 in which a further locating member is disposed between the formations for locating the device.

9. An electrical assembly having a housing and an electrical device, the electrical device having a conductive terminal extending directly outward therefrom, the housing having a body with a formation thereon, the formation comprising an elongate tubular member closed at one end by an end wall, and a slot extending through the end wall and along a side of the tubular member to define a channel, the channel being arranged to removably receive and locate the terminal of the device from one side of the body and the tubular member defining a passage to receive and locate a terminal fitting from the other side of the body, the channel being at least partially coincident with the passage to effect electrical connection of the terminals.

10. An assembly according to claim 9 wherein the terminal of the device extends at right angles to said terminal fitting in the passage.

11. An assembly according to claim 10 wherein said terminal fitting in the passage is attached to a wire, and said wire includes a seal adapted for fitting in said through channel to prevent ingress of moisture.

12. An assembly according to claim 9 wherein the device is an electric motor.

13. An assembly according to claim 12 wherein said terminal of the device extends at right angles to said terminal fitting in the passage.

14. An assembly according to claim 13 wherein said terminal fitting is attached to a wire, and said wire includes a seal adapted for fitting in said channel to prevent ingress of moisture.

15. An assembly according to claim 9 in which two such formations are provided for receiving and locating respective terminals of the device.

16. An assembly according to claim 15 in which a further locating member is disposed between the formations for locating the device.

17. An assembly according to claim 15 in which the formation extends on both sides of said body on a common axis.

\* \* \* \* \*